United States Patent Office 2,782,140
Patented Feb. 19, 1957

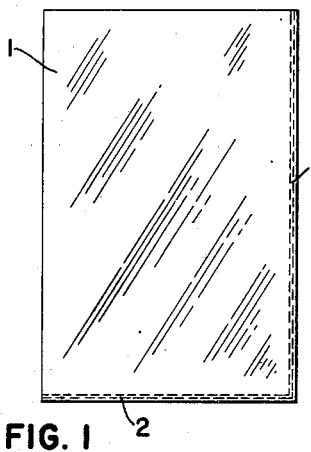
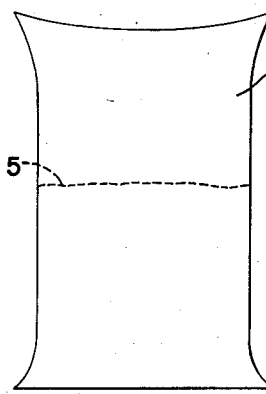
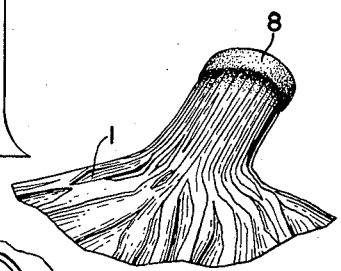
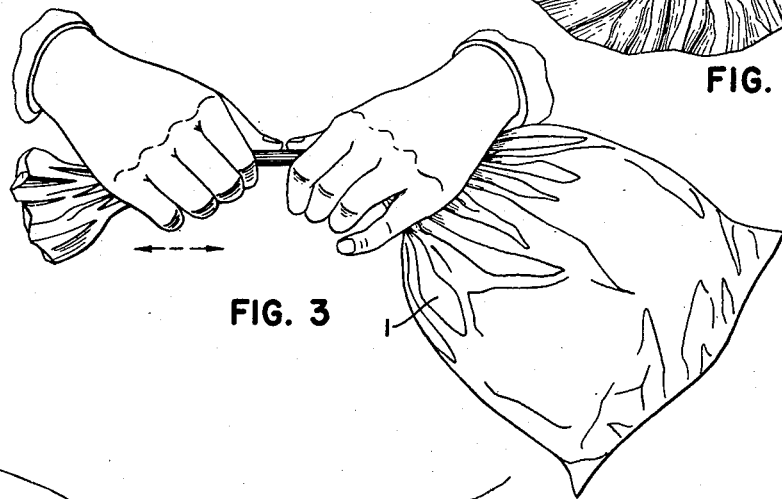
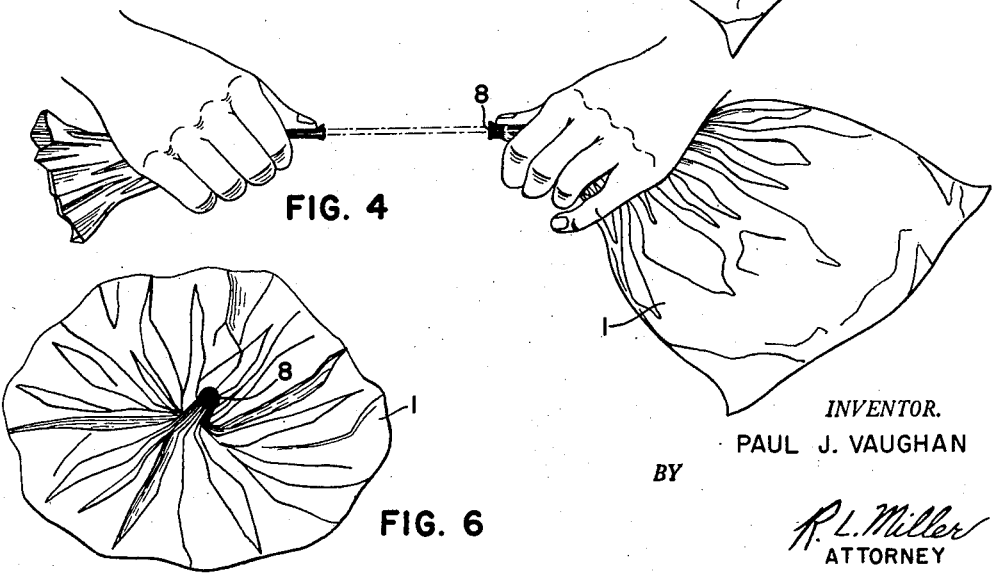
FIG. 1
FIG. 2
FIG. 3
FIG. 4
FIG. 5
FIG. 6
INVENTOR.
PAUL J. VAUGHAN

2,782,140

METHOD OF THERMALLY SEALING RUBBER HYDROCHLORIDE FILMS

Paul J. Vaughan, Cuyahoga Falls, Ohio, assignor, by mesne assignments, to The Goodyear Tire & Rubber Company, a corporation of Ohio Application September 4, 1953, Serial No. 378,476

4 Claims. (Cl. 154—124)

This invention relates to a new method of forming a seal between contacting layers of rubber hydrochloride film, as at the mouth of a package formed of such film. The film is made sufficiently plastic to permit it to be stretched appreciably before reaching the breaking point either by adding a plasticizer or by warming if the film contains no plasticizer. Rubber hydrochloride is elastoplastic and the film retracts after such breaking. The seal which is formed is different from the ordinary heat seal. It is formed by heat generated during such retraction. Such a seal is referred to herein as a snap-seal.

It is not generally recognized that a rubber band or the like, stretched until broken, snaps back at a very high velocity. R. B. Stambaugh, reporting on this phenomenon in "The retraction of stretched rubber" in The Physical Review, vol. 65, Nos. 7 and 8, page 250, April 1 and 15, 1944, says:

"The retraction starts at the released end (of a rubber strip which has been stretched until it is broken) and progresses in a wave until it reaches the stationary end. . . . It is interesting to note that the sharpness of this retraction wave front is dependent on the internal friction of the elastic material."

I believe that rubber hydrochloride behaves similarly, and that because its internal friction is so high, sufficient heat is developed by the retraction wave to cause contacting layers of the film to fuse and seal together along the hair line at which the film breaks. However, I don't want to be bound by this or any other theory or explanation; the invention lying in the process and product as claimed.

The snap-seal may be formed with a flat sheet of plastic rubber hydrochloride film or several such sheets, by folding or gathering them, and stretching them until they snap. However, the snap-seal operation is designed particularly for the sealing of packages.

The package may be a bag with a single mouth or a tube with a mouth at each end. The seal is formed by gathering the film at the mouth or mouths of the package so that adjacent layers are in contact with one another as the film is stretched. It is stretched until it breaks. Stretching quickly, usually facilitates breaking. Because the film is in a stretched condition when it breaks, it breaks with a snap and retracts substantially instantaneously.

In many respects, the properties of rubber hydrochloride are comparable to rubber, and it seems probable that the seal formed along the substantially straight line along which the gathered film breaks or snaps is a result of the progression of the retraction wave front away from this line. The film may be merely bunched together, or it may be systematically folded. Regardless of just what it is that occurs when the film snaps, both ends of the gathered film at the break are fused and thereby sealed. The seal is usually substantially hairline in width. The exposed edge is beaded with many minute beads.

It is evident that the beaded edge is heated to the fusion temperature immediately after the break. This was determined by pulling apart the film on the opposite sides of several snap seals, immediately after the seals were formed. The seals were found to be soft and somewhat jelly like. The heat of the retraction of the film had been sufficient to raise the temperature of the rubber hydrochloride to the amorphous transition point (loosely called the melting point). Seals of rubber hydrochloride film formed by ordinary heating are similarly soft and somewhat jelly like when freshly formed. They harden only after standing several days.

The snap-seals were further examined after they had stood several days until they had hardened. Seals formed with a minimum of recoiled material were selected for this purpose. It was found that areas of contacting layers adjacent the line of the true heat seal, were blocked together. Although the films adhered throughout these areas they could be separated by a needle point without destroying their continuity. Along the line of the true heat seal, however, where the film had been fused and beads of the fused material occurred, separation by a needle point was impossible. In these areas a true heat seal had been formed by the heat produced during retraction of the film.

The plasticized rubber hydrochloride film used in carrying out the invention may contain as little as 10 parts of plasticizer per 100 parts of rubber hydrochloride and as much as 40 or more parts. For instance, film plasticized with 10 parts of butyl stearate may be used. Films containing as much as 20 parts or more of plasticizer are ordinarily formulated by using a mixture of plasticizers because film containing this high proportion of a single plasticizer is apt to bleed. Suitable films may, for example, contain 15 parts dibutyl sebacate and 15 parts 2-ethylhexyl-diphenyl phosphate, or 20 parts dibutyl sebacate and 20 parts di-isobutyl adipate, or 20 parts dibutyl sebacate and 10 parts butyl stearate, etc. There are various commercial film formulations containing 10 parts or more of plasticizer, and all of these have sufficient elasticity to be used in carrying out the invention at room temperature.

The invention will be more particularly illustrated by reference to the accompanying drawings which show the production of a snap-seal on a bag composed of 100 parts by weight of rubber hydrochloride, 35 parts by weight of copolymer of 67 percent butadiene and 33 percent acrylonitrile, and 20 parts by weight of dibutyl sebacate. In the drawings—

Fig. 1 shows an unopened bag;

Fig. 2 shows the bag partially filled;

Fig. 3 shows how the mouth of the bag is gathered to form a seal;

Fig. 4 shows how the seal is formed by stretching the film until it breaks; and

Figs. 5 and 6 show views of the finished seal from different angles.

The bag 1 illustrated in Fig. 1 is made by doubling a flat sheet of rubber hydrochloride film and sealing the doubled film together at the bottom and one side to form the seams 2 and 3. A bag formed in any manner may be employed.

Figure 2 shows the bag 1 filled with any material whatever, which is indicated by the reference numeral 5.

To form the seal the mouth of the bag is gathered together as illustrated in Fig 3. The gathered portion is grasped manually or by mechanical means on both sides of where the seal is to be formed, and then the grasping means are separated, pulling the respective portions of the film with them until the film breaks. The film breaks clean along a substantially straight line which is perpendicular to the direction of stretch. Generally the sealed area is substantially hairline in width. At times a somewhat wider area having a fused ragged edge is formed of recoiled material which separates more or less into fibers if the edges of the film are separated at the seal. The folds of the film adjacent the seal are closely compacted as the film is first stretched and then retracts after the break, and become sufficiently heated to become blocked together, but without forming a true heat seal.

Two views of the completed seal are shown in Figs. 5 and 6. They show the fused seal, the inner edge of which is a substantially straight line, the opposite edge being beaded with many minute beads 8.

After the seal has cooled and recrystallized it is strong enough to withstand shipment and is suitable for commercial packages. It may be used to seal the mouth of a bag or to seal both ends of a tubular package. If a single sheet of film is stretched to enclose an orange, grapefruit, head of lettuce or like fruit or vegetable, etc., the edges of the film may be gathered together to complete the enclosure around the material to be packaged, and the gathered film may be stretched and snapped to form such a seal. The film will ordinarily be used at approximately room temperature, and for this reason the invention is described as carried out with plasticized film. If warm film is employed, it need not be plasticized.

Although the invention has been illustrated more particularly with reference to sealing a bag, it is understood that it is applicable to the sealing of other packages. It is also applicable to the formation of seals with flat films of rubber hydrochloride, two or more of which may be sealed together by stretching and breaking the films while in contact with one another; or a single ply of the film may be regularly folded or bunched, thereby bringing surfaces of the ply together, and then sealing such surfaces together by stretching the film and thereby breaking it.

What I claim is:

1. The method of sealing adjacent plies of plastic rubber hydrochloride film together, which method comprises stretching the film until it breaks with the adjacent layers of the film contacting one another at and during the break, and thereby fusing the edges of said layers together at the break.

2. The method of sealing adjacent plies of rubber hydrochloride film together, which comprises warming the plies sufficiently to make them plastic, stretching the film until it breaks with the adjacent layers of the film contacting one another at and during the break, and thereby fusing the edges of said layers together at the break.

3. The method of sealing adjacent plies of rubber hydrochloride film together, the rubber hydrochloride containing at least 10 parts by weight of plasticizer per 100 parts of the rubber hydrochloride, which method comprises stretching the film until is breaks with the adjacent layers of the film contacting one another at and during the break, and thereby fusing the edges of said layers together at the break.

4. The method of sealing a package formed of rubber hydrochloride film containing at least 10 parts by weight of plasticizer per 100 parts of the rubber hydrochloride, which method comprises gathering the film together at a mouth of the package and stretching it until it breaks, whereby the stretched film retracts and contacting layers of the film are sealed together at the break.

References Cited in the file of this patent

UNITED STATES PATENTS

| | | |
|---|---|---|
| 1,998,807 | Galvin | Apr. 23, 1935 |
| 2,235,682 | Hawley | Mar. 18, 1941 |
| 2,238,342 | Riehl | Apr. 15, 1941 |
| 2,259,362 | Young | Oct. 14, 1941 |
| 2,351,350 | Mallory | June 13, 1944 |
| 2,429,177 | Young | Oct. 14, 1947 |
| 2,442,405 | Fornwalt | June 1, 1948 |
| 2,594,229 | Snyder et al. | Apr. 22, 1952 |
| 2,735,797 | Schjeldahl | Feb. 21, 1956 |

FOREIGN PATENTS

| | | |
|---|---|---|
| 647,059 | Great Britain | Dec. 6, 1950 |